United States Patent [19]

Eggers et al.

[11] Patent Number: 4,982,322

[45] Date of Patent: Jan. 1, 1991

[54] APPARATUS AND METHOD FOR PROHIBITING ACCESS IN A MULTI-CACHE DATA PROCESSING SYSTEM TO DATA SIGNAL GROUPS BEING PROCESSED BY A DATA PROCESSING SUBSYSTEM

[76] Inventors: Thomas W. Eggers, 95 Matawanakee Trail, Littleton, Mass. 01460; Stephen J. Shaffer, Slough Rd., Harvard, Mass. 01451; Richard A. Warren, 8501 Alverstone Way, Austin, Tex. 78759

[21] Appl. No.: 315,240

[22] Filed: Feb. 21, 1989

Related U.S. Application Data

[63] Continuation of Ser. No. 698,366, Feb. 5, 1985, abandoned.

[51] Int. Cl.[5] ..................... G06F 12/08; G06F 15/16
[52] U.S. Cl. .................. 364/200; 364/228.1; 364/243.4; 364/243.41; 364/243.44
[58] Field of Search ................. 364/200, 900

[56] References Cited

U.S. PATENT DOCUMENTS

| | | | |
|---|---|---|---|
| 3,735,360 | 5/1973 | Anderson et al. | 364/200 |
| 3,833,889 | 9/1974 | Clay | 364/200 |
| 4,000,485 | 12/1976 | Barlow et al. | 364/200 |
| 4,073,005 | 2/1978 | Parkin | 364/200 |
| 4,394,727 | 7/1983 | Hoffman et al. | 364/200 |
| 4,394,731 | 7/1983 | Flusche et al. | 364/200 |
| 4,513,367 | 4/1985 | Chan et al. | 364/200 |
| 4,567,562 | 1/1986 | Fassbender | 364/200 |
| 4,604,694 | 8/1986 | Hough | 364/200 |
| 4,622,631 | 11/1986 | Frank et al. | 364/200 |
| 4,648,030 | 3/1987 | Bomba et al. | 364/200 |

*Primary Examiner*—Gareth D. Shaw
*Assistant Examiner*—Kevin A. Kriess
*Attorney, Agent, or Firm*—William W. Holloway; John M. Gunther

[57] ABSTRACT

To prevent simultaneous usage of selected data signal groups in a data processing system, techniques are described to restrict such usage. First, with each location capable of storing a data signal group, a register cell can be assigned either in the main memory or in the cache memory units. When a data processing unit requests the data signal group, the register cell associated with each location in which the requested data signal group is stored has a control signal stored therein, and the control signal prohibits usage by another data processing unit. At the end of the activity, the requesting data processing unit removes the register cell control signal from all the locations storing the requested data signal group and the data signal group is then available to any requesting data processing unit. For groups of data signal groups, a file header can contain a control signal in a pre-selected location that identifies to the requesting processing unit that when the signal control is present, the file is unavailable for manipulation. In addition, the presence of the file protect control signal causes the data processing unit to execute a sub-routine, periodically interrogating the file header data signal group stored in the cache memory unit until the file protect signal is removed. After removal of the file protect signal, the execution of the program instruction sequence can continue. The file protect signal is stored in the file header signal group locatioin when the first data processing unit requests access to the file. Using the file protect signal the related cache memory unit addressing sub-routine, activity involving the system bus can be minimized.

14 Claims, 4 Drawing Sheets fig. 1 fig. 2 fig. 3b fig. 3a fig. 4 fig. 6

APPARATUS AND METHOD FOR PROHIBITING ACCESS IN A MULTI-CACHE DATA PROCESSING SYSTEM TO DATA SIGNAL GROUPS BEING PROCESSED BY A DATA PROCESSING SUBSYSTEM

This is a continuation of co-pending application Ser. No. 06/698,366 filed on Feb. 5, 1985, now abandoned.

BACKGROUND OF THE INVENTION

1. Related Applications

Apparatus and Method for Data Copy Consistency in a Multi-Cache Data Processing Unit invented by Stephen J. Shaffer and Richard A. Warren, Ser. No. 06/698,364, filed on Feb. 5, 1985 and assigned to the assignee named herein.

Apparatus and Method for Improving System Bus Performance in a Data Processing System having a Plurality of Data Processing Units by Stephen J. Shaffer, Richard A. Warren, Thomas W. Eggers and William D. Strecker, Ser. No. 06/698,399, filed on Feb. 5, 1985 and assigned to the assignee named herein.

2. Field of the Invention

This invention relates generally to data processing systems and, more particularly, to data processing systems having a plurality of data processing units. In the data processing systems with a plurality of data processing units, the multiple copies of data signal groups stored in the cache memory units associated with each data processing unit provide increased opportunity for accessing a data signal group that is being manipulated simultaneously by at least one other data processing unit. In order to prevent inconsistent results from being obtained by the simultaneous manipulation, selected data signal groups are prevented from simultaneous manipulation by the data processing system.

3. Discussion of the Related Art

In data processing subsystems, a plurality of the system units such as data processing units and/or one or more peripheral subsystems, can attempt to access simultaneously a data signal group stored in the main memory unit. The simultaneous or overlapping access of the selected data signal groups by a plurality of data processing subsystems can result in inconsistent, ambiguous and erroneous data signal groups obtained that can impact the operation of the data processing system unless appropriate mechanisms are embedded in the data processing system.

One such mechanism is the use of a register position in the main memory that, once set, prevents further access of the main memory. This register position is set once access to the main memory is acquired, and further of the data signal group access is prohibited until the current access is complete and the register position signal is removed. This mechanism is sometimes described as an interlock mechanism.

However, a mechanism, that prevents access to the main memory unit for the duration of an operation by a data processing unit involving the selected data signal group, can impact the performance of the data processing system. In a data processing system having a plurality of data processing units, the continuing attempts of the data processing units to gain access to the main memory unit can cause non-productive bus traffic, comprising the performance of the data processing system.

A need has therefore been felt to prevent simultaneous use of selected data signal groups by a plurality of data processing units and to reduce system bus activity resulting from continuing attempts to access the prohibited data signal group.

SUMMARY

It is therefore an object of the present invention to provide a method and apparatus for an improved data processing system.

It is another object of the present invention to provide a method and apparatus to prevent the manipulation of selected data signal groups simultaneously by two subsystems of a data processing system.

It is yet another object of the present invention to provide a method and apparatus for an improved data processing system having a plurality of data processing units.

It is a more particular object of the present invention to provide an apparatus and method resulting in both a hardware and a software mechanism for preventing simultaneous access to reserved data signal groups.

It is another particular object of the present invention to provide an apparatus and method for reducing the system bus activity normally resulting from attempts to access selected data signal groups that are already in the process of being manipulated, and are therefore unavailable to the requesting data processing unit.

It is a more particular object of the present invention to provide apparatus either in a cache memory unit or in a main memory unit to prevent simultaneous manipulation of selected data signal groups.

It is another more particular object of the present invention to reduce unnecessary bus traffic by providing apparatus in the cache memory units for prohibiting simultaneous manipulation of selected data signal groups.

It is yet another more particular object of the present invention to provide apparatus in the main memory unit for minimizing system bus traffic while prohibiting simultaneous manipulation of selected data signal groups.

The aforementioned and other objects are accomplished, according to the present invention, by providing a data processing system having a plurality of data processing units in which all the copies of a data signal group are identical, and wherein selected individual data signal groups are protected from manipulation by other portions of the data processing system by means of a control signal having a predetermined relationship with the data signal groups, and wherein files of data signal groups can be protected by a control signal having a pre-selected relationship with the data signal group files. The protection of the data signal group can be accomplished by a storage cell capable of storing a control signal associated with the data signal group. The storage cell can be located in the main memory unit and/or in the cache memory unit. Each time the signal in the storage cell is present, the data signal group is protected from further manipulation. This signal is used to prevent any subsystem of the data processing system, except requesting subsystem setting the signal, from accessing or performing any operations in this selected data signal group while the subsystem is currently actively manipulating this data signal group. Another control signal can be associated with a file of data signal groups, and this file is unavailable to the subsystems as long as the subsystem program using the data signal groups of the file maintains the active signal. Thus, two methods of protecting the data signal groups against possible conflicting manipulation are provided, each capable of reducing system bus traffic. When the data signal group file are to be protected, the subsystem requesting the file retrieves a selected data signal group prior to the actual use of the file. The data group retrieved has a position for a control signal identifying when the file is in current use. If the file is in use, this information will be understood by the program and the program will periodically interrogate the selected data group until the data signal location indication of current usage has been changed to a file available designation by the program, i.e., upon completion of its use of the files. If the file is free, the program requiring the file data signal groups will, when the control signal group is retrieved, set the control signal in the location in the file indicating that the file is currently unavailable for manipulation by other data processing units. In this manner, the system bus does not need to be utilized for establishing a file usage during manipulation of the selected data signal group. The second method of protecting a data signal group against simultaneous manipulation is to set a register position when the data signal group is unavailable.

These and other features of the instant invention will be understood by reading of the following description along with the drawings.

DESCRIPTION OF THE PREFERRED EMBODIMENT

Figure 1:
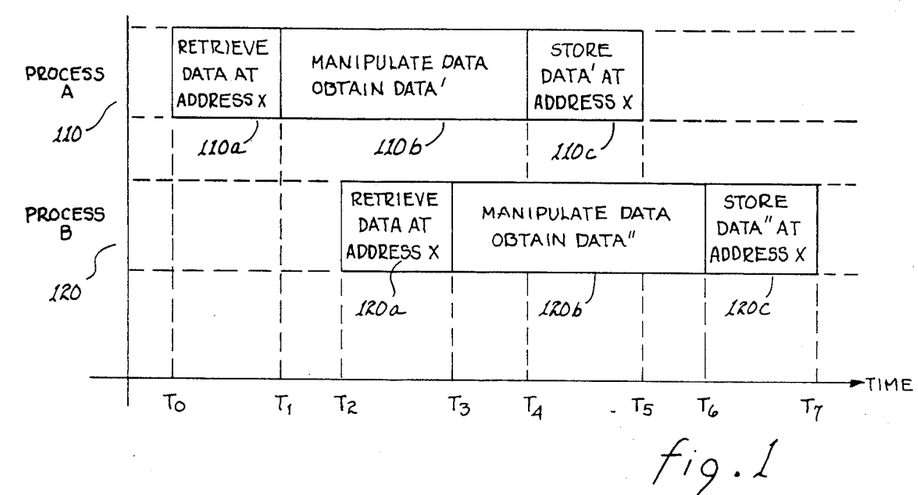
FIG. 1 is a representation of the possible conflict arising when two processes attempt to use the same data group simultaneously.

Referring to FIG. 1, a pair of processes are shown that require the same data group for manipulation. At time To, process A retrieves 110a DATA group from address X. The process A manipulates 110b the DATA group and the result of the manipulation is a DATA' group. During the manipulation by process A, process B retrieves 120a the data group from the memory address x, and the process B manipulates 120b the DATA group. The result of this manipulation is a DATA" group. During the manipulation of the DATA group by process B, process A stores 110c the result of the manipulation, DATA' group, in the memory address X. At the end of the manipulation by process B, the resulting DATA" group is stored 120c in the memory address X, replacing the DATA' group stored at that location by process A.

Figure 2:
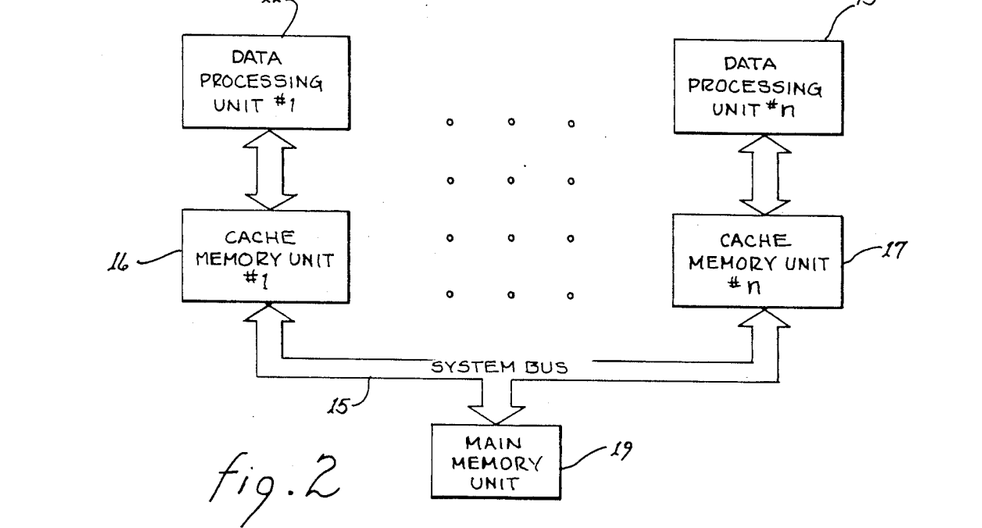
FIG. 2 is a block diagram of a data processing system capable of utilizing the present invention.

Referring to FIG. 2, a block diagram of a data processing system having a plurality of data processing units is shown. A plurality of data processing units, data processing unit #1, 11, through data processing unit #n, 13, perform the manipulation of data signal groups under control of at least one system program. Cache memory unit #1, 16, is coupled to data processing unit #1, 11, and cache memory unit #n, 17, is coupled to data processing unit #n, 13. Similarly, all of the other data processing units, not shown, are coupled to cache memory units. All of the cache memory units are coupled to a system bus 15 and the system bus 15 is in turn coupled to main memory unit 19.

Figure 3A:
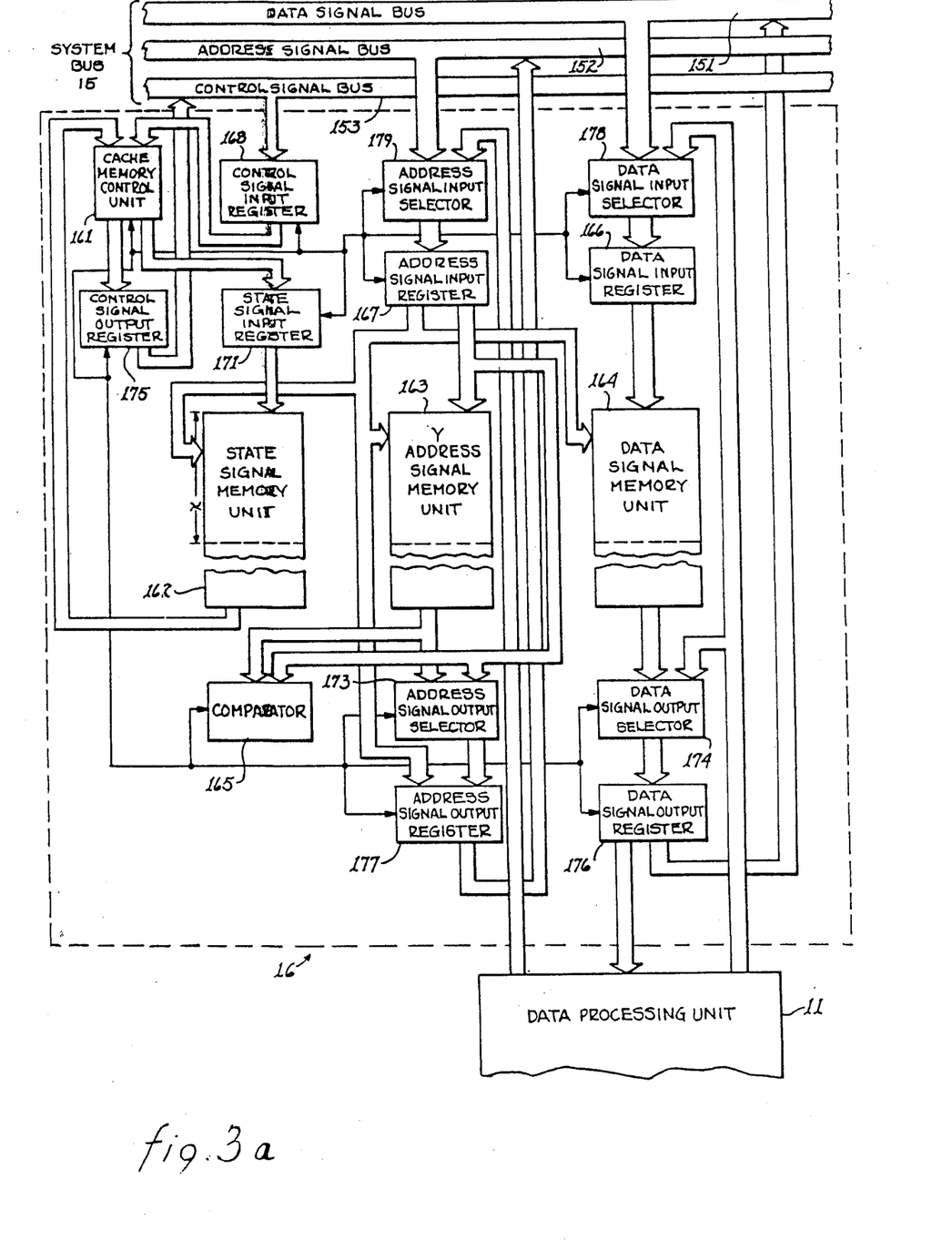
FIG. 3a is a schematic block diagram of a cache memory unit capable of implementing the present invention.

Referring to FIG. 3a, the system bus is shown as including three sub-buses, a data signal bus 151, an address signal bus 152 and a control signal bus 153. The cache memory unit 16 is coupled to the system bus 15 and to the data processing unit 11 as follows. Control signal input register 168 receives signals from control signal bus 153, and applies signals to cache memory control unit 161. Cache memory control unit 161 applies signals to control signal output register 175 and to state signal input register 171. State signal input register 171 applies signals to state signal memory unit 162. State signal memory unit 162 applies signals to cache memory control unit 161. Control signal output register 175 applies signals to control signal bus 153. Address signal input selector 179 receives signals from address signal bus 152 and from data processing unit 11 and applies signals to address signal input register 167. Address signal input register 167 applies signals to state signal memory unit 162, to y-address memory unit 163, to data signal memory unit 164, to address signal output selector 173, to comparator 165 and to address signal output register 177. Address signal output selector 173 and comparator 165 also receive signals from y-address signal memory unit 163. Address signal output register 177 also receives signals from address signal output selector 173 and applies signals to address signal bus 152. Data signal input selector 178 receives signals from data signal bus 151, and data processing unit 11. Data signal unit register 166 receives signals from data signal input selector 178 and applies signals to data signal memory unit 164. Data signal output selector 174 receives signals from data signal memory unit 164 and from data processing unit 11 and applies signals to data signal output register 176. Data signal output register 176 applies signals to data processing unit 11 and to data signal bus 151. The cache memory control unit 161 is coupled to data processing unit 11, to control signal out register 175, to control signal input register 168, to comparator 165, to address signal output selector 173, to address signal output register 177, to state signal input register 171, to address signal input selector 179, to address signal input register 167, to data signal input selector 178, to data signal input register 166, to data signal output selector 174, and to data signal output register 176.

Figure 3B:
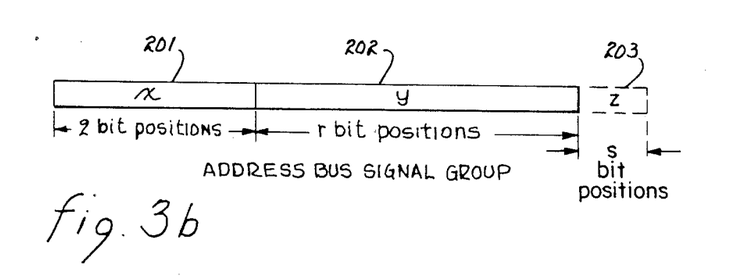
FIG. 3b is a diagram demonstrating the address signal sub-groups for an address signal group.

Referring to FIG. 3b, the structure of the address signal groups is defined. For purposes of description of the present invention, the address signal group is divided into three subgroups; an x-address signal group 201 having q logic signal positions, a y-address signal group 202 having r logic signal positions, and a z-address signal group 203 having s logic signal positions. The x-address signal group 201 defines a physical location of signal groups in the cache memory signal storage components. The y-address signal group 202 is the portion of the address signal group stored in address signal group memory unit 163 at the x position when the data signal group corresponding to the address (x+y) is stored in the data signal group memory unit 164. The z-address group 203 is an address signal group portion that is redundant when multiple basic data signal groups are transferred on the system bus simultaneously and identified by a single address signal group.

Figure 4:
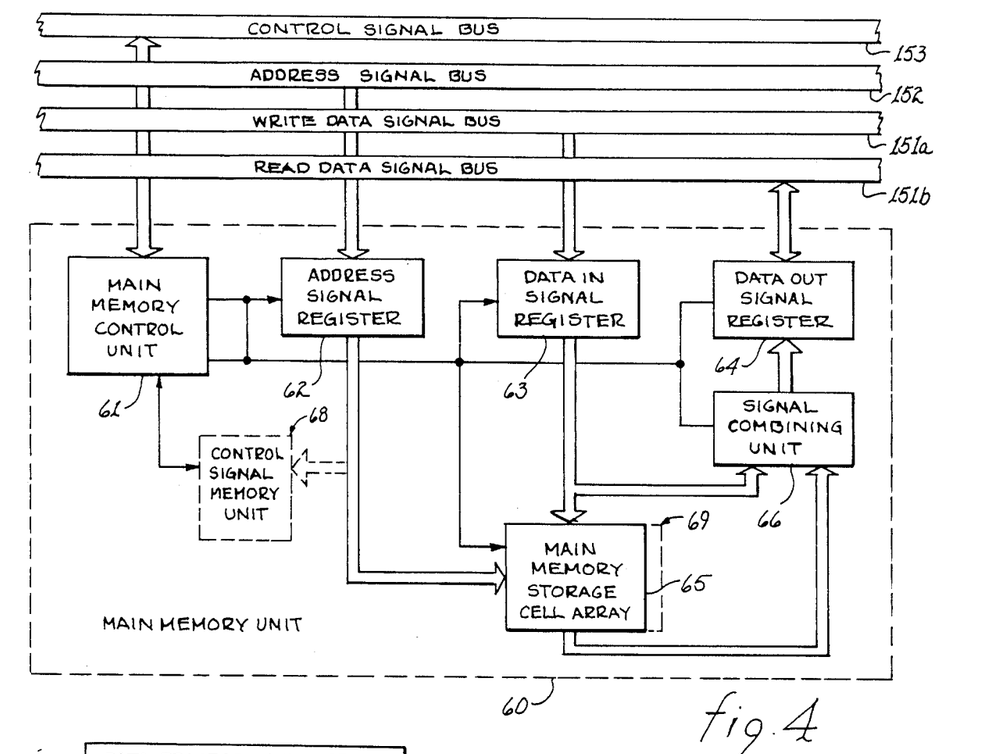
FIG. 4 is a block diagram of a main memory unit capable of utilizing the present invention.

Referring to FIG. 4, the main memory unit 60 has a main memory control unit 61 coupled to control signal bus 153 forming part of the system bus. 15. Address signal register 62 is coupled to address signal bus 152, while data in signal register 63 is coupled to write data signal bus 151a of the system bus 15 and data out signal register 64 is coupled to read data signal bus 151b. Signals from the address signal register 62 establish a location in main memory storage cell array 65. Data in signal register 63 applies data signal groups to a location in the main memory storage cell array 65 determined by the address signal group in the address signal register 62 and applies data signal signal groups to signal combining unit 66. Data signal groups from a main memory storage cell array 65, determined by the address signal group in address signal register 62, are applied to signal combining unit 66. The data signal groups in signal combining unit 66 are applied to data out signal register 64. Data out signal register 64, signal combining unit 66, data in signal register 63, address signal register 62 and main memory storage cell array 65 are controlled by main memory control unit 61. Control signal memory unit 68 receives address signals from address signal register 62 and is coupled to main memory control unit 61. The section 69 of main memory storage cell array 65 illustrates additional storage cells associated with the cells storing the data signal groups.

Figure 5:
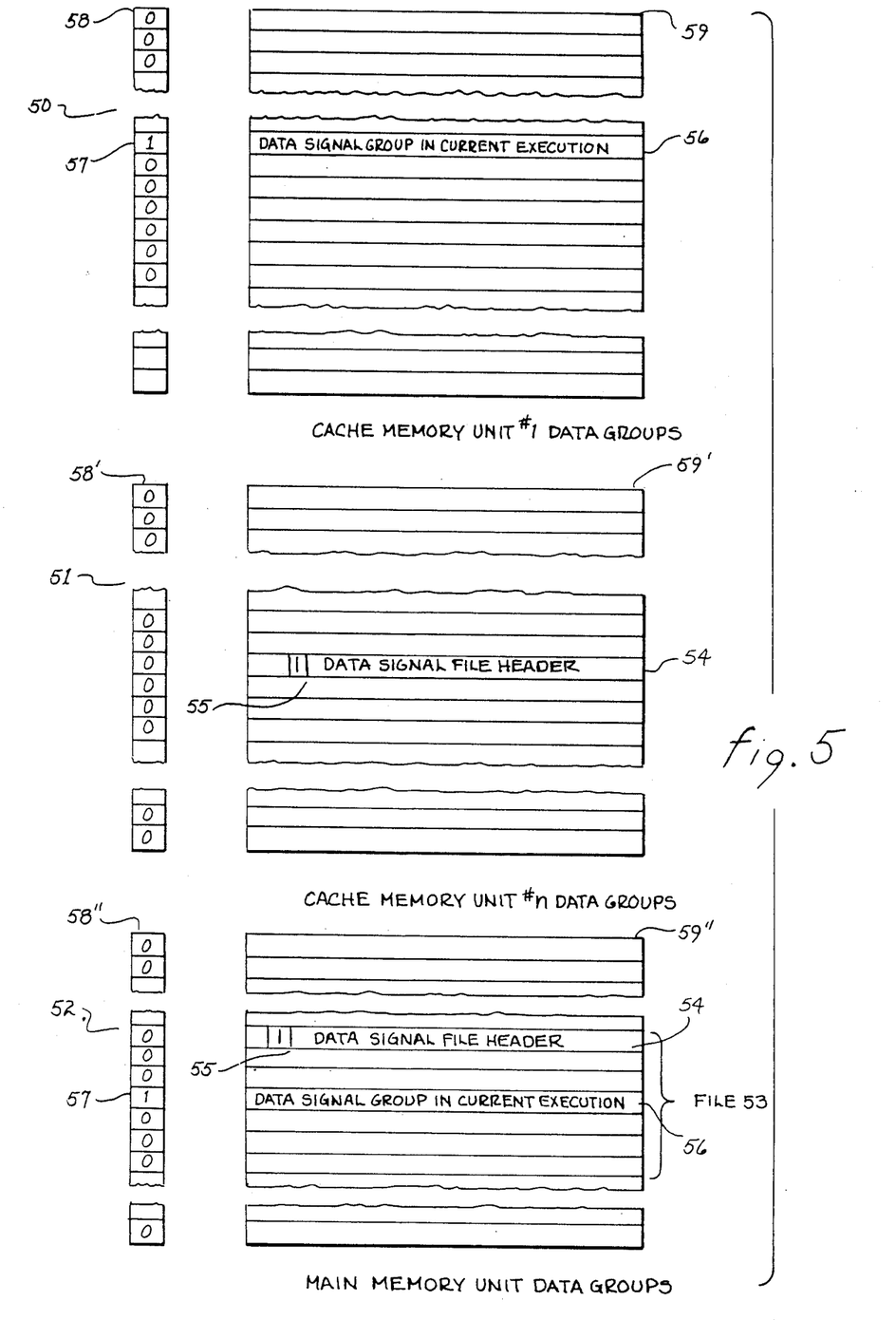
FIG. 5 is a schematic diagram of data signal groups being manipulated by data processing unit.

Referring next to FIG. 5, an example of the relevant contents of various data signal storage units are shown for a data signal file that is currently being manipulated under control of a first data processing unit and to which a second data processing unit is attempting to gain access. Associated with cache memory unit #1 is a multiplicity of data signal storage cells 50. The data signal storage cells are arranged in a multiplicity of groups of data storage cells 59 and associated with each group of data storage cells is a control signal storage cell from the plurality of data signal storage cells 58. Similarly, in cache memory unit #n, a multiplicity of data signal storage cells 51 is divided into a multiplicity of groups of data signal storage cells 59' and associated with each data signal storage cell group is a control signal storage cell from the group of control signal storage cell 58'. In the main memory unit, a multiplicity of data signal storage cells 52 is divided into groups of data signal storage cells 59" and associated with each data signal storage cell group is a control signal storage cell from the group of control signal storage cells 58". In the example shown in FIG. 5, the group of data signal storage cell groups 53 contains a data signal file. The data signal file has a file header (which may contain more than the one data file signal group shown) for a file of data signal groups and the header contains at least one data signal storage position 55 having a predefined interpretation. The signal in the position 55 can be referred to as a file protect signal. In the example shown, the data processing unit associated with cache memory unit #1 is currently manipulating the data signal file. In every occurrence of the data signal file header 54 in the data processing system (i.e. in cache memory unit #n and in the main memory unit), the data signal storage cell has a predefined data signal stored therein indicating current usage by a component of the data processing system. In the example of FIG. 5, data signal file header 54 has been replaced in cache memory unit #1, and is no longer present. However, the data signal group in current execution 56 is present and because that particular signal group is being currently manipulated by a data processing unit associated with cache memory unit #1, the associated control signal storage cell 57 as well as all control storage cells 57 associated with the data signal group in current execution 56 have the pre-selected control signal stored therein.

Figure 6:
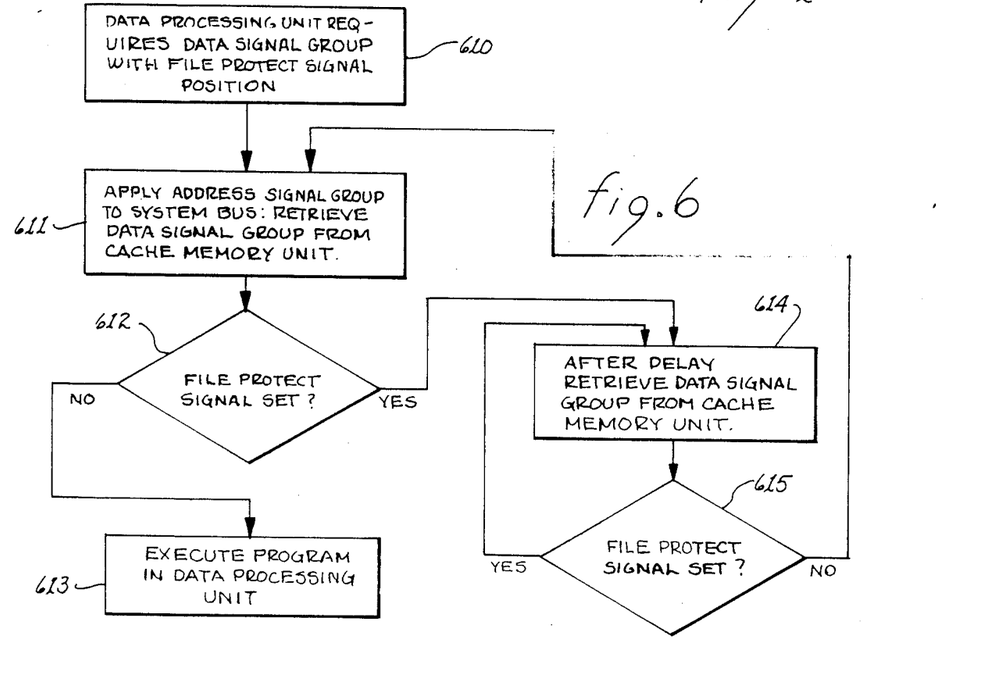
FIG. 6 is a block diagram of a procedure using a file protect signal for a plurality of data signal groups.

Referring next to FIG. 6, the process for using the file protect signal (i.e. the predefined signal in memory cell 55) is described. In step 610, the data processing unit has a requirement for the data signal group with the file protect signal position. The data processing unit applies the address signal group associated with the data signal group to the system bus and retrieves that data signal group from the cache memory unit in step 611. In step 612, the data group is examined to determine if the file protect signal is present. If the file protect signal is not present, then the data processor unit sets the file protect signal and manipulates the data signal group as determined by the program in current execution in the data processing unit in step 613. The setting of the file protect signal is reflected in all copies of the data signal group. If, in step 612, the file protect signal is set, then step 614 is executed in which the data signal group is retrieved from the cache memory unit storage cells after a predetermined delay. If the file protect signal is still set in step 615, the data processing unit then executes step 614 and continues in this loop until retrieval of the data signal group from the cache memory unit indicates that the file protect signal is no longer present. The process than returns to step 611 and proceeds as previously described. At the end of usage of the file, the data processing system using the file removes the file protect signal permitting usage by other data processing systems.

OPERATION OF THE PREFERRED EMBODIMENT

The use of a single storage cell in the main memory control unit that prohibits access to the main memory unit while a selected data signal group is being manipulated can cause a large amount of unproductive traffic on the system bus as other data processing units attempt to gain access to the main memory unit. Another storage cell can be added to the main memory control unit and each cell can be used to prohibit access to half of the main memory. As will be clear, a decrease in unproductive bus traffic will result because half the main memory data signal groups can be available for access by a requesting cache memory unit. To minimize the unproductive bus traffic, the instant invention provides either a control signal memory unit 68 or additional main memory storage cells 69 in array 65. With respect to the additional main memory storage cells 69, the granularity of the unavailability of the data signal groups of the main memory can be diminished even to the point of prohibiting access to a single data signal group when sufficient additional storage cells are added. Viewed in another way, the available portion of the main memory unit can be increased as additional storage cells are provided. When a selected data group is being manipulated, the associated storage cell in control signal memory unit 68 or main memory storage cell array 65 can have a logic signal stored therein prohibiting access to the associated data signal group of the main memory unit by other data processing units or peripheral subsystems. The control signal memory unit 68 can be described as main memory cache memory, comprised of an array of single storage cells, each storage cell associated with a region of the main memory. The control signal memory unit 68 can store a signal associated with each region and is immediately accessed when an address is applied to the main memory unit. Thus, the resulting indication of inaccessibility of the data signal group can be returned immediately to the requesting data processing unit and the data retrieval can be aborted.

System bus traffic can also be reduced by placing the storage cells associated with each cache memory unit storage location, for example, in the state signal memory unit 162 in FIG. 3a. In this embodiment, the signal groups of the address signal bus and the control signal bus are continuously monitored. When a selected data signal group is being manipulated by a data processing unit, a logic signal can be set in the state signal memory unit 162 when the data signal group is stored in the cache memory unit and the corresponding address signal group and control signals are applied to the system bus 15. This control signal can prohibit manipulation of the related data signal group by the associated data processing unit. When the manipulation of the selected data signal group is complete, the manipulating data processing unit can communicate the fact, via the system bus, by applying the address signal group and appropriate control signals to the system bus, and the logic signal will be removed from the state signal memory unit 162 of the cache memory unit of a different processing unit. It will be clear that utilizing the storage cells in the cache memory unit reduces the bus traffic because the inaccessibility of the selected data signal group can be determined in the immediate environment of the cache memory unit and associated data processing unit without accessing the system bus.

Referring once again to FIG. 5, the mechanisms for maintaining consistency in selected data signal files while minimizing the utilization of the system bus 15, are shown. The mechanisms require two constraints. The first constraint is that all data signal groups and associated control signal groups associated with an address signal group are identical in the data processing system. Second, the header of each file of data signal groups either includes a sub-routine or activates a mechanism in the data processing unit that permits the data processing unit to address the associated cache memory unit without having the address signal group applied to the address bus. Thus, a data processing unit, seeking access to a data signal file, will identify the predefined control signal in file header and will engage in a process loop involving the repeatedly addressing the data signal file header and the control signal in the cache memory unit by the coupled data processing unit without interaction with the system. However, when data processing unit #1 completes the manipulation of the data signal file, a routine will set the predefined signal in the data signal file header to the opposite value permitting usage by other systems. Because of the first constraint, i.e. the identity of data signal group identified by a given address, the predefined data signal in location 55 in the data signal file header will be set to an opposite binary value in all copies of the data. The next access of the data processing unit associated with the cache memory unit #n, the data processing unit will equality the absence of the predefined signal and can access the data signal file header in the previously described manner. The control signals of data signal cells 58, 58' etc. provide a hardware mechanism preventing access to that data signal group by any data processing unit in the data processing system. The pre-selected signal is transmitted on the system bus when each data processing unit accesses the data signal group at that address.

It will be clear that a procedure similar to the file protect signals can be implemented for the logic signals stored in the storage cells in the main memory unit indicating inaccessibility of the associated data signal group. In this procedure, the fact that a logic signal is stored in the main memory unit can be communicated throughout the data processing system. By appropriate procedures that prohibit attempts by the data processing unit to access the data until the logic signal of the main memory has been removed, the data processing system can continue internal activity. The activity on the system bus including an address signal group and appropriate control signals communicates to the data processing system the availability of the data signal group.

The above description is included to illustrate the operation of the preferred embodiment and is not meant to limit the scope of the invention. The scope of the invention is to be limited only by the following claims. From the foregoing discussion, many variations will be apparent to one skilled in the art that would yet be encompassed by the spirit and scope of the invention.

What is claimed is:

1. A data processing system comprising:
    a plurality of data processing units, each of said data processing units including a cache memory unit, each of said cache memory units having a storage means for storing signal groups at locations determined by an address associated with each signal group, each of said cache memory units further having a cache storage unit, each cache storage unit having a plurality of signal storage locations, each cache storage unit location determined by an associated signal group address;
    at least one main memory unit including storage means for storing a multiplicity of signal groups, said main memory unit further including a memory storage unit, said memory storage unit having a plurality of signal storage locations, each storage unit location determined by an associated signal group address; and
    communication means coupled to each of said data processing units and said main memory unit for maintaining equivalent copies of all valid signal groups and all storage unit location signals in said data processing system by communicating information relating to each access by a first data processing unit of an accessed signal group stored in its cache memory unit, said communication means storing a predetermined signal in each associated storage unit location of cache memory units storing said accessed signal group while said accessed signal group is being processed by said first data processing unit;
    wherein each of said data processing units further includes control means responsive to a first access of said accessed signal group and to said associated predetermined signal stored in a cache memory unit of a second data processing unit by said second data processing unit, said control means for periodically accessing said associated predetermined signal without interaction with said communication means and for prohibiting processing of said accessed signal group by said second data processing unit until said predetermined signal associated with said accessed signal group is removed from said second data processing unit cache memory unit by said communication means.

2. The data processing system of claim 1 wherein preselected files of signal groups have an inhibit signal location included therein, an executing data processing unit storing an inhibit signal in an inhibit signal location of a first preselected set of signal groups while processing said first preselected file of signal groups, said communication means storing said inhibit signal in an inhibit signal location of each instance of said first preselected file of signal groups while said first preselected signal group is being processed by said executing data processing unit, wherein a control means of an inhibited data processing unit is responsive to a first access of said preselected file of signal groups stored in a cache memory unit of said inhibited data processing unit having said inhibit signal stored therein for periodically accessing said preselected file of signal groups by said inhibited data processing unit without interaction with said communication means and for prohibiting processing of said preselected signal group by said inhibited data processing unit until said inhibit signal in said preselected file of signal groups is removed from said inhibited data processing unit cache memory unit by said communication means.

3. The data processing system of claim 2 wherein said inhibited data processing unit requesting said first preselected file of signal groups retrieves a signal group stored in its cache memory unit having said inhibit signal location, a presence of said inhibit signal causing said inhibited data processing unit control means to access periodically said signal group having said inhibit signal location without processing said first preselected file of signal groups or activation of said communication means until said inhibit signal is removed.

4. The method of reducing activity of a system bus of a data processing system having a plurality of data processing units, each data processing unit having a cache memory unit coupled thereto, wherein all valid copies of each signal group are maintained identical in said data processing system by communicating information relating to each access of a signal group to all data processing system subunits storing an accessed signal group, the method comprising the steps of:
providing a first signal storage cell associated with each cache memory unit signal group storage location in each cache memory unit;
storing a preselected signal in a first signal storage cell when said associated signal group storage location stores a selected signal group in a first cache memory unit and said selected signal group is being processed by a coupled first data processing unit;
storing said preselected signal in a first signal storage cell of a second cache memory unit storing said selected signal group in an associated signal group location when said selected signal group is being processed by said first data processing unit;
when a second data processing unit first accesses said selected signal group stored in said coupled second cache memory unit and having said predetermined signal stored in an associated first signal storage cell, causing said second data processing unit in response to said preselected signal to access periodically said preselected signal without communication of said preselected signal access to a remainder of said data processing system as long as said predetermined signal is stored in said second cache memory unit;
removing said preselected signal from said second cache memory unit when said first data processing unit completes processing of said selected signal group and signal groups associated therewith; and
when said preselected signal associated with said selected signal group stored in said second cache emory unit is not present and said selected signal group is accessed by said second data processing unit, permitting said second data processing unit to process said selected signal group.

5. A method of preventing a second data processing unit of a data processing system from processing a file of signal groups currently being processed by a first data processing unit, wherein all copies of a signal group and related control signals in said data processing system are identical as a result of communication of information relating to each access of a signal group stored in a cache memory unit by a data processing unit coupled to said cache memory unit, said method comprising the steps of:
storing a first control signal in a predetermined location of each copy of a file of signal groups being processed by said first data processing unit;
transferring and storing a copy of a signal group having said first control signal in a second cache memory unit when said coupled second data processing unit attempts to process said file of signal groups, a presence of said first control signal in said signal group causing said second data processing unit to access periodically said signal group stored in said second cache memory unit until said first control signal is removed from said second cache memory unit, a presence of said control signal prohibiting processing of said file of signal groups by said second data processing unit, a presence of said control signal prohibiting communication relating to access of said signal group having said first control signal by said second data processing unit to a remainder of said data processing system.

6. The method of preventing a second data processing unit of a data processing system from processing a file of signal groups currently being processed by a first data processing unit of claim 5 wherein said storing step includes the steps of:
a. providing a preselected signal group of each said file of signal groups with a first location;
b. storing said preselected signal group in said first cache memory unit when said first data processing unit processes said file;
c. examining said first location stored in said first cache memory unit by said first data processing unit requesting aid file to determine when said first control signal is present;
d. setting said first control signal in said first location and in first locations of all valid copies of said preselected signal group in said data processing system when said first control signal is not present;
e. processing said file of signal groups by said first data processing unit after setting said first control signal by said first data processing system; and
f. removing said first control signal from said all valid copies of said preselected signal group when said first data processing unit has completed processing said file of signal groups.

7. A data processing system for reducing system bus traffic resulting from processing preselected files of signal groups in a multi-processor data processing system, said data processing system comprising:
- a plurality of data processing units, each data processing unit including a cache memory unit, each data processing unit storing signal groups in its cache memory unit, wherein each preselected file includes a specified signal group having a predetermined location for storing a predetermined signal;
- a main memory unit for storing signal groups;
- a communication means including a system bus coupled to each cache memory unit and said main memory unit for providing that all valid copies of a stored signal group stored in said data processing system are identical by applying said stored signal group, an address signal group identifying said stored signal group and related control signals to said system bus when said stored signal group in a cache memory unit is accessed by a coupled data processing unit;
- wherein each data processing unit includes a signal means coupled to said communication means for storing said predetermined signal in said predetermined location of every valid copy of said stored signal group when said stored signal group is being processed by a first data processing unit; and
- wherein each data processing unit includes a control means responsive to said predetermined signal stored in said specified signal group of said preselected file stored in a second data processing unit cache memory unit and accessed by said second data processing unit for preventing processing of said preselected file by said second data processing unit when said predetermined signal is stored in said specified signal group, said predetermined signal causing said second data processing unit to access said specified signal group in said second cache memory unit periodically, said periodic access to said specified signal group occurring without interaction with said communication means.

8. The data processing system of claim 7 wherein said first data processing unit signal means applies signals to said communication means for removing said predetermined signal from said every valid copy of said specified signal group of said preselected file processed by said first processing unit when said first processing unit has completed processing said preselected file.

9. Apparatus in a data processing system for preventing simultaneous processing of a signal group by more than one data processing unit; said data processing system including a system bus, a main memory unit and a plurality of data processing units; wherein all valid copies of a signal group in said data processing system are maintained identical by communication of information related to access by a data processing unit to a signal group stored therein, said communication of information transferred between said data processing units on said system bus; said apparatus comprising:
- a plurality of storage means, each storage means coupled to a data processing unit for storing a predetermined signal at a location associated with a selected signal group when a data processing unit is processing said selected signal group;
- a plurality of identification means, each identification means coupled to a data processing unit for determining when said selected signal group is being processed by a data processing unit storing said selected signal group and storing said predetermined signal in said coupled storage means, said identification means coupled to a data processing unit processing said selected signal group communicating to each storage means not coupled to said data processing unit processing said selected signal group and said main memory unit for storing said predetermined signal at each location in said data processing system storing said selected signal group, said predetermined signal preventing a second data processing unit from processing said selected signal group, said second processing unit periodically accessing said predetermined signal location without communication of said accessing to said system bus while said predetermined signal is present; and
- a plurality of removal means, each removal means coupled to a data processing system for determining when a coupled data processing unit has completed processing said selected signal group and related signal groups and for communicating to each of said coupled and non-coupled storage means completion of said selected signal group processing, said removal means causing each of said predetermined signals to be removed.

10. Apparatus for preventing simultaneous processing of a selected signal group of claim 9 wherein each of said storage means includes an addressable storage array for storing said predetermined signal at an address associated with said selected signal group, wherein said main memory includes an addressable storage array coupled thereto for storing said predetermined signal at an address associated with said selected signal group.

11. Apparatus for preventing simultaneous processing of a selected signal group of claim 10 wherein said system bus includes a sub-bus for distributing control signals, said control signals communicating access to said selected signal group by a data processing unit processing said selected signal group and communicating completion of processing of said selected signal group and associated signal groups by said data processing unit processing said selected signal group to storage means coupled to said second data processing prevented from processing said selected signal group.

12. Apparatus for preventing simultaneous processing of a selected signal group of claim 11 wherein processing of said selected signal group by said data processing unit processing said selected signal group is communicated to data processing units not processing said selected signal group by applying an address signal group associated with said selected signal group and control signals to said system bus.

13. A data processing system including a plurality of data processing unit and a main memory unit coupled to a system bus; wherein signal groups are transferred between said data processing units and between said main memory unit and said data processing units in said data processing system by applying an address signal group associated with said signal group along with control signals and said signal group so said system bus; wherein a signal group, an address signal group, and control signals are applied to said system bus for each access to a signal group stored in a cache memory unit of a data processing unit by said data processing unit to maintain all valid copies of signal groups identical in said data processing system, each data processing unit comprising:
- first storage means in each cache memory unit for storing a plurality of signal groups at addressable locations;

second storage means in each cache memory unit having a plurality of storage units each for storing a predetermined signal, each of said storage units associated with at least one of said addressable locations, each storage unit associated with said addressable location being addressed when said associated addressable location is addressed by a coupled data processing unit;

signal means for applying a first control signal to said system bus when a data processing unit processes a preselected signal group and associated signal groups and for applying a second control signal to said system bus when said data processing unit is finished processing said preselected signal group and associated signal groups, said signal means responsive to said first and to said second control signals from said system bus for storing and removing said predetermined signal from a storage unit in a second cache memory unit associated with an addressable location storing a copy of said preselected signal group; and control means for periodically accessing an addressable location having said predetermined signal stored in said associated storage unit without communication with said system bus, said control means preventing processing of copies of said preselected signal group.

14. The method of preventing simultaneous processing of signal groups in a data processing system, said data processing system including a plurality of data processing units coupled to a system bus, each of said data processing units having a cache memory unit with a plurality of storage locations associated therewith, the method comprising the steps of:

associated a signal storage cell with each addressable cache storage locations in said data processing units, wherein access to an addressable storage location is communicated by said cache memory unit data processing unit to said system bus;

storing a predetermined signal in said signal storage cell with a selected signal group of each data processing unit not processing said selected signal group when said associated cache storage location stores an instance of said selected signal group and said selected signal group and associated signal groups are being processed by a first data processing unit; and addressing said associated signal storage cell each time said selected signal group is addressed by a second data processing unit, a presence of said predetermined signal preventing processing of said selected signal group by said second data processing unit, said predetermined signal preventing said second data processing unit from communicating with said system bus, a presence of said predetermined signal permitting only periodic access to said selected data group by said second data processing unit.

* * * * *

UNITED STATES PATENT AND TRADEMARK OFFICE
CERTIFICATE OF CORRECTION

PATENT NO. : 4,982,322

DATED : January 1, 1991

INVENTOR(S) : Thomas W. Eggers, Stephen J. Shaffer, Richard A. Warren

It is certified that error appears in the above-identified patent and that said Letters Patent is hereby corrected as shown below:

Column 10, Line 9 "emory" should be --memory--

Signed and Sealed this

Twenty-seventh Day of October, 1992

Attest:

DOUGLAS B. COMER

Attesting Officer

Acting Commissioner of Patents and Trademarks